United States Patent [19]

Cook et al.

[11] 4,451,488

[45] May 29, 1984

[54] FOOD BAR

[75] Inventors: Milton L. Cook, Algonquin; William L. Keyser, East Dundee; Paul Swanson, Crystal Lake, all of Ill.; Michael W. Zielke, Lowell, Mich.; Walter J. Zielinski, Ingleside, Ill.

[73] Assignee: The Quaker Oats Company, Chicago, Ill.

[21] Appl. No.: 510,474

[22] Filed: Sep. 2, 1983

Related U.S. Application Data

[63] Continuation of Ser. No. 276,393, Jun. 22, 1981, abandoned, Continuation-in-part of Ser. No. 233,382, Jun. 22, 1981, abandoned.

[51] Int. Cl.³ .......................... A23L 1/10; A23L 1/34
[52] U.S. Cl. ..................................... 426/89; 426/93; 426/96; 426/102; 426/103; 426/541; 426/548; 426/615; 426/618; 426/625; 426/639; 426/640; 426/810
[58] Field of Search .............. 426/93, 96, 102, 103, 426/272, 285, 331, 541, 548, 615, 617, 618, 625, 632, 639, 640, 658, 454, 512, 810, 631

[56] References Cited

U.S. PATENT DOCUMENTS

| | | | |
|---|---|---|---|
| 2,437,150 | 3/1948 | Berg | 426/285 |
| 3,100,909 | 8/1963 | Schapiro | 426/285 |
| 3,431,712 | 3/1969 | Durst | 426/285 X |
| 3,434,843 | 3/1969 | Durst | 426/810 X |
| 3,812,268 | 5/1974 | Corey et al. | 426/454 X |
| 3,882,253 | 5/1975 | Schaffer et al. | 426/285 X |
| 3,903,308 | 9/1975 | Ode | 426/93 |
| 3,973,041 | 8/1976 | DuRoss | 426/548 X |
| 4,038,427 | 7/1971 | Martin | 426/285 |
| 4,146,652 | 3/1979 | Kahn et al. | 426/658 X |
| 4,152,462 | 5/1979 | Hayward et al. | 426/103 X |
| 4,156,020 | 5/1979 | Bohrmann et al. | 426/285 X |

FOREIGN PATENT DOCUMENTS 716689 10/1954 United Kingdom ............... 426/548

*Primary Examiner*—Arthur L. Corbin
*Attorney, Agent, or Firm*—Karen E. Ayd

[57] ABSTRACT

A shelf stable, intermediate moisture, food bar having a soft and chewy texture with good taste is disclosed. Lowered sugar content and good texture and taste characteristics are maintained through the use of a combination of at least two polyhydric alcohols in varying ratios, one of which comprises a sugar alcohol and the other either glycerol or propylene glycol. In preferred embodiments the two polyhydric alcohols are glycerol and sorbitol employed in a ratio of glycerol to sorbitol in the range 1:1 to 5:1. Despite a low total sugar content the water activity may be maintained in the 0.2–0.55 range through the use of such polyhydric alcohols while achieving a soft texture.

10 Claims, No Drawings

FOOD BAR

This is a continuation of Ser. No. 276,393 filed June 22, 1981, which is a continuation-in-part parent case U.S. Ser. No. 233,362, filed June 22, 1981, both of which are now abandoned.

BACKGROUND OF THE INVENTION

This application relates to a ready to eat food product and more particularly to a granola food bar having long shelf life and good flavor.

Food bars or, as they may be appropriately termed, snack bars, have been known and available for some time. Some snack bars generally contain a grain or grains, nuts, possibly dried fruit, sweeteners and other ingredients. These ingredients can be mixed with a binder such as a sugar syrup or shortening and compressed into bars or slabs which may be later cut to a desired size. Depending on the snack bar's composition it may be mixed, formed, and/or baked prior to packaging and sale.

For achieving good results in compressed foods, the addition of glycerine to the food, as taught in U.S. Pat. No. 2,437,150 to Berg, has been taken to yield better mold release and bonding strength of the overall food bar. Other polyhydric alcohols have also been known to achieve similar results on its addition of a compressed food though to a lesser degree, and only in small amounts.

In recent years a new technology has emerged in the food industry utilizing the concept of an intermediate moisture food product for extending shelf life. As is known, high levels of moisture in a food generally promote the microbiological spoiling and growth of organisms such as yeast, molds and bacteria. Stabilization of food products have heretofore traditionally been effected through the use of inherent properties of food, such as the naturally high acid content that occurs in tomato sauces and the like; sterilization of the food followed by hermetic sealing; drying the food to under 10 percent moisture; or freezing the food product. Each of the above methods of preserving foods has drawbacks. For instance, a high acid content approach may only be utilized with certain foods. Hermetically sealing and sterilizing foods becomes relatively expensive and can destroy the flavor of some foods. Frozen foods must be defrosted prior to use and may not be refrozen.

This intermediate moisture foods recently introduced rely on the reduction of the availability of water in the food to prevent microbial growth and lengthen shelf life. Such availability of water in the food is commonly termed "water activity" ($A_w$). In general, a low $A_w$ of the food product (under 0.90) indicates the existence of an environment in which most bacteria will not generally grow.

The $A_w$ of the food, or the partial vapor pressure of the water at the temperature of the food, can be experimentally determined by placing the sample in a sealed container and, upon reaching equilibrium, determining the relative humidity in the head space above the sample.

The principle or extending the shelf life of a food product by lowering the meter activity of that food product was first demonstrated in U.S. Pat. No. 3,202,514 to Burgess et al., which disclosed an intermediate moisture pet food. Pet food prepared according to this patent was capable of being stored in conventional moisture protective wrapping materials and eliminated by necessity for hot packing or thermal sterilization incident to packaging. With such a composition and packaging, the pet food could be stored for extended periods of times under non-refrigerated conditions without incurring any significant risk of microbiological spoilage, of recontammination or of product discoloration.

In general, Burgess demonstrated that the $A_w$ of a food product could be maintained at a low level through a high sugar content. Polyhydric alcohols such as glycerine and sorbitol have been suggested as individual suitable substitutes for sucrose in U.S. Pat. No. 4,146,652 to Kahn et al. The addition of glycerine, sorbitol and other polyhydric alcohols individually to food bars has been known to provide better texture on their addition. Until now it had not always been possible to take full advantage of these qualities as the use of each such polyhydric alcohol by itself can yield a product with an undesirable taste and texture which becomes more evident as the concentration level is increased. Such poor taste and texture characteristics are difficult to overcome by conventional methods.

SUMMARY OF THE INVENTION

Accordingly, it is an object of the subject invention to provide a healthful and tasteful ready to eat food bar.

It is another object of the subject invention to provide a food bar with good shelf life, good texture, and good flavor.

A further object of the subject invention is a food bar having a low water activity for a longer shelf life through the addition of a combination of polyhydric alcohols while retaining good flavor characteristics and improved soft texture.

These and other objects and advantages of the subject invention are obtained in accordance with the present invention wherein there is provided a ready-to-eat food bar comprising natural growth cereals such as oats, rice, wheat and the like; a binder system including sugars, e.g. sucrose, invert sugars, corn syrup, and shortening; salt, flavoring, antioxidants, and a combination of sorbital and glycerol. Although the sugar content is relatively low and the moisture level of the mixture of the subject invention is between 4–8 percent, the water activity can be kept below 0.55 through the use of the polyhydric alcohol combinations of the subject invention. With the above ingredient mixture, soft texture and excellent, stable taste characteristics are obtained. Through the use of at least two of the above identified polyhydric alcohols, the water activity is lowered to an optimum level in the range of 0.2–0.55 while improving the taste and texture of the mixture. The taste and texture of the resulting food bar can be precisely controlled by proper selection of the polyhydric alcohols and control of the relative amounts added. In preferred embodiments the two polyhydric alcohols are glycerol and sorbitol employed in a ratio of glycerol to sorbitol in the range 1:1 to 5:1. With the low water activity of the subject invention provided by addition of the polyhydric alcohols to the corn syrup and other ingredients, there is inherently more stability, not only microbiologically but also oxidative and hydrolytic stability as perceived through the absence of rancidity.

The novel features of the invention both as to the product and the method of making the product together with further objectives and advantages thereof will be better understood from the following description in which the presently preferred method and composition of the invention is set forth.

DETAILED DESCRIPTION OF THE INVENTION

Current food or snack bars comprise mixtures of rolled oats, brown sugar, a binder such as shortening or corn syrup, coconut oil, honey, salt, sesame seeds, and possibly an antioxidant. Mixing and drying these ingredients when forming the food bar results in a dry, crumbly product having a hard texture. However, adding combinations of polyhydric alcohols as will be set forth to such a mixture prior to forming the bars yields a bar of softer texture, chewy with good stable taste attributes. In addition, the bars need not be further dried to achieve the desired low water activity.

The combinations of polyhydric alcohols which may be added according to the subject invention include at least one sugar alcohol, such as sorbitol, mannitol, or xylitol; the sugar alcohol is used in conjunction with either glycerin or propylene glycol to achieve the desired good taste and soft, chewy texture, as well as achieve a bacteriostatic action through the lowering of the water activity of the resultant food bar.

The granola cereal mix containing oat and wheat flakes, rice, almonds, peanuts, coconut, raisins and chocolate chips, which has been used as the main component can give the dominant texture and flavor characteristics to the product, providing it is not overshadowed and overcome by the remaining ingredients. An excess of such granola mix can make the food bar dry and crumbly; conversely, too little granola mix will render the food bar too moist with an excessively high water activity. A typical granola cereal mix for use in the subject invention has the composition set forth in Table I. All percentages expressed herein are in percent by weight based on the weight of the material or mixture then referred to.

TABLE I
GRANOLA MIX

| Oat and Wheat Flakes | 52 pts |
|---|---|
| Peanuts | 7 |
| Whey Solids | 3.5 |
| Milk Solids | 4 |
| Coconut | 7.5 |
| Sugar | 15 |
| Corn Syrup | 5 |
| Shortening | 10 |
| Honey | 1 |

In the following examples specific preferred embodiments are disclosed utilizing the above granola mix as its main component. It should be understood that other mixes including fruits, nuts, grains, vegetables or any combination of these foods in any desired amounts may be used and as such, are intended to be within the scope of the subject invention.

EXAMPLE I

| Granola Mix | 55 pts |
|---|---|
| Dried Fruit | 10 |
| Corn Syrup | 10 |
| Crisp Rice | 5 |
| Sugar | 6 |
| Glycerine (96% solution) | 3 |
| Shortening | 6 |
| Peanuts | 2 |
| Sorbitol (70% solution) | 1.43 |
| Salt and other flavorings | 0.5 |
| Antioxidant Preparation | trace |

The dry base ingredients were blended. The binder ingredients, i.e. the sugars, glycerin, sorbitol, and corn syrup were mixed separately with the salt and antioxidant and heated to 125°–135° F. The corn syrup was mixed in with the binder ingredients and the entire binder mixture added to the pre-mixed dry ingredients and blended. A measured amount of the entire mixture was poured into a forming mold where it was pressed to the desired size and density. The resulting bars were placed into aluminum pouches and hermetically sealed.

The bars thus prepared had water activity of 0.31 to 0.40 with a moisture content of 5.2 to 6 percent. The bar was soft and chewy with good taste and no evidence of a bitter glycerin flavor. The glycerin to sorbitol ratio was approximately 2.9:1.

EXAMPLE II

| Granola Mix | 55 pts |
|---|---|
| Chocolate Chips | 10 |
| Corn Syrup | 10 |
| Crisp Rice | 5 |
| Sugar | 6 |
| Glycerin (96% solution) | 3.45 |
| Shortening | 6 |
| Mannitol (70% solution) | .98 |
| Salt and other flavorings | 0.5 |
| Antioxidant Preparation | trace |

The above ingredients were utilized in preparing a food bar in a manner similar to that set forth for Example I, resulting in a food bar having a water activity of 0.31 to 0.40 with a total moisture content of 4.5 to 5.1 percent. The resulting bar had good texture with good taste. No bitter glycerin taste was noted and the food bar was soft and chewy. The glycerin to mannitol ratio was approximately 4.8:1.0.

| Granola Mix | 55 pts |
|---|---|
| Chocolate Chips | 10 |
| Corn Syrup | 10 |
| Crisp Rice | 5 |
| Sugar | 6 |
| Propylene Glycol | 3.76 |
| Shortening | 6 |
| Mannitol (70% solution) | .98 |
| Salt and other flavorings | 0.5 |
| Antioxidant Preparation | trace |

The above ingredients were mixed to prepare a food bar according to the procedure set forth in Example I and resulted in a food bar having a water activity of 0.31 to 0.40 which appeared stable after nine months storage at 73° F. The propylene glycol to mannitol ratio was approximately 5.48:1.0.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a, dry, ready to eat food bar of the type containing (a) a mixture of dry ingredients selected from the group consisting of grains, fruits, nuts, chocolate chips, and vegetables; (b) flavorings and salt; (c) antioxidant; (d) shortening; (e) sugar; and (f) at least about 3% glycerol; and having a moisture content in the range 4–8%, a water activity between about 0.2 to about 0.55 and a soft chewy texture, the improvement wherein:

sorbitol is present in a ratio 1:1 to 1:5, based on the weight of the glycerol, to mask the bitter flavor of the glycerol.

2. The food bar of claim 1 wherein the mixture of dry ingredients is selected from the group consisting of oat flakes, wheat flakes, almonds, coconut, rice, raisins and chocolate chips.

3. The food bar of claim 1 wherein the water activity is between 0.31 and 0.4.

4. The food bar of claim 1 wherein the sugar is selected from the group consisting of corn syrup, invert sugar, and sucrose.

5. The food bar of claim 1, wherein the glycerol to sorbitol ratio is 2.9:1.0.

6. In a ready to eat granola bar having good flavor, soft chewy texture, a moisture content in the range 4–8% and a water activity between about 0.2 to about 0.55 of the type containing (i) a mixture of dry ingredients selected from the group consisting of grains, fruits, nuts, chocolate chips and vegetables (ii) salt, (iii) flavoring, (iv) antioxidant, and (v) a binder system comprising shortening, sugar, and at least about 3% glycerol, the improvement wherein:

sorbitol is present in the binder system in a ratio of 1:1 to 1:5 based on the weight of glycerol, to mask the bitter flavor of the glycerol.

7. The granola bar of claim 6, wherein the mixture of dry ingredients is selected from the group consisting of oat flakes, wheat flakes, almonds, coconut, rice, raisins and chocolate chips.

8. The granola bar of claim 6, wherein the water activity is between 0.31 to 0.4.

9. The granola bar of claim 6, wherein the sugar is selected from the group consisting of corn syrup, invert sugar, and sucrose.

10. The granola bar of claim 6, wherein the ratio of glycerol to sorbitol is 2.9:1.0.

* * * * *